(12) United States Patent
Ahlstrom et al.

(10) Patent No.: US 6,222,452 B1
(45) Date of Patent: Apr. 24, 2001

(54) ELECTRONIC IDENTIFICATION TAG

(75) Inventors: Lucas Ahlstrom, Sollentuna; Lars-Goran Johansson, Smedjebacken, both of (SE)

(73) Assignee: Confidence International AB, Sollentuna (SE)

( * ) Notice: Subject to any disclaimer, the term of this patent is extended or adjusted under 35 U.S.C. 154(b) by 0 days.

(21) Appl. No.: 08/991,144

(22) Filed: Dec. 16, 1997

Related U.S. Application Data

(60) Provisional application No. 60/032,987, filed on Dec. 16, 1996.

(51) Int. Cl.[7] .................................................. G08B 13/14

(52) U.S. Cl. ..................................... 340/572.1; 340/572.8; 340/568.1; 340/571

(58) Field of Search ............................. 340/572.1, 572.6, 340/572.7, 572.8, 571, 568.1, 568.7, 568.5, 539

(56) References Cited

U.S. PATENT DOCUMENTS

| | | | | |
|---|---|---|---|---|
| 3,720,940 | * | 3/1973 | Fox et al. | 340/572.1 |
| 3,832,530 | * | 8/1974 | Reitboeck et al. | 340/572.1 |
| 4,694,283 | * | 9/1987 | Reeb | 340/572.1 |
| 4,900,386 | * | 2/1990 | Richter-Jorgensen | 340/572.1 |
| 5,184,111 | * | 2/1993 | Pichl | 340/572.1 |
| 5,608,417 | * | 3/1997 | De Vall | 340/572.1 |
| 5,645,932 | * | 7/1997 | Uchibori | 340/572.1 |
| 5,654,693 | * | 8/1997 | Cocita | 340/572.1 |
| 5,793,305 | * | 8/1998 | Turner et al. | 340/572.1 |

* cited by examiner

*Primary Examiner*—Nina Tong
(74) *Attorney, Agent, or Firm*—John E. Reilly

(57) ABSTRACT

An electronic identification tag is made up of at least one cover strip and a carrier strip having an antenna and transponder mounted thereon, and an adhesive to secure the strips together such that the antenna is interposed between the strips, the transponder being pre-programmed to generate a signal having a unique code correlated with indicia on the tag to identify a passenger or luggage. The tag further lends itself well to a novel method of tracking luggage and passengers in a transportation facility.

21 Claims, 5 Drawing Sheets

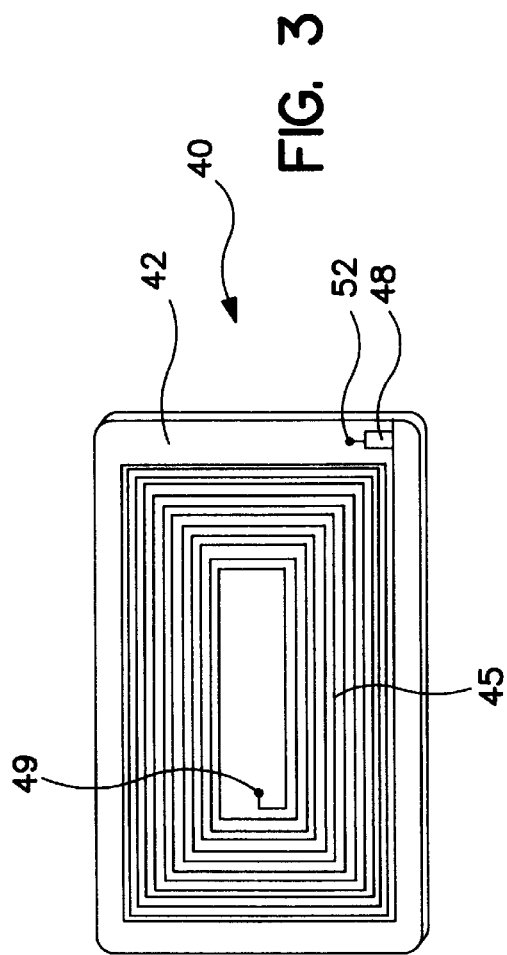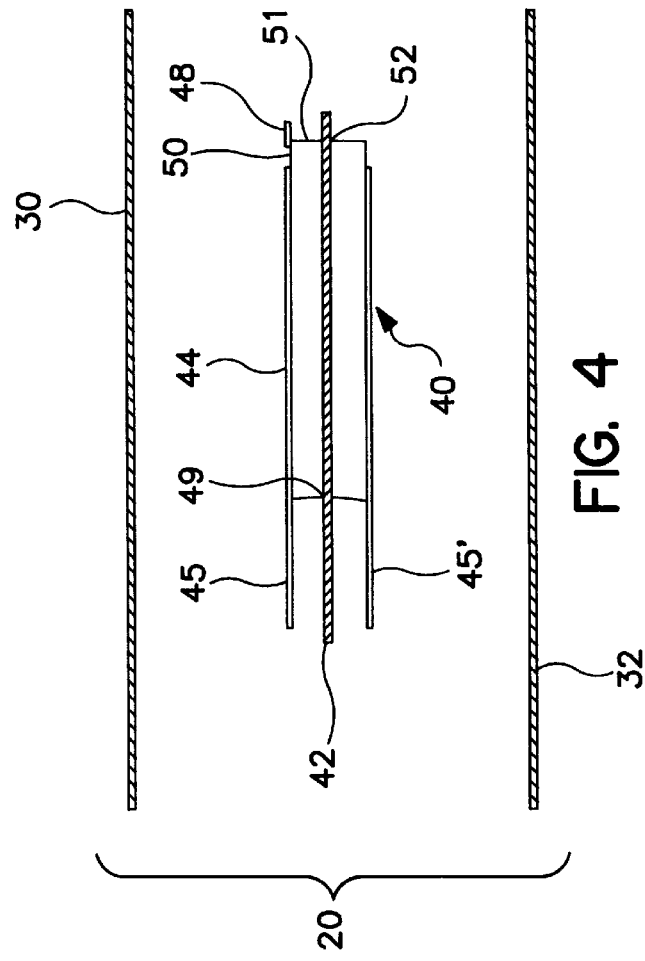

ELECTRONIC IDENTIFICATION TAG

CROSS REFERENCE TO RELATED APPLICATION

This application is a continuation-in-part of Provisional Patent Application entitled ELECTRONIC IDENTIFICATION TAG, Ser. No. 60/032,987, filed Dec. 16, 1996 by L. Ahlstrom et al and assigned to the assignee of the present invention.

BACKGROUND AND FIELD OF INVENTION

The present invention relates to an identification tag, and more particularly to an electronic identification tag that is very thin and readily used upon luggage.

For a variety of reasons, most especially increasing incidents of terrorist incidents resulting from the planting of explosives within luggage aboard passenger planes and trains, it is desirable to reliably, quickly, and inexpensively identify and track luggage items placed aboard common carriers. Also, a common complaint of passengers using common carriers is the frustration of misdirected, lost, or delayed luggage. Both the security of common carriers, and the elimination of the problem of lost luggage, are promoted by reliable identification of luggage items. Identifying luggage and other items in passenger terminals and aboard planes and trains historically has been performed primarily by means of simple printed hang tags affixed to the luggage and bearing the owner's name and address, and occasionally the logo of the common carrier company. Hang tags printed solely with the passenger's name assist in reuniting lost or delayed luggage with its rightful owner, but do little to avoid initial misdirection. In recent years, common carriers have used paper tags imprinted with laser-readable bar codes as a means for identifying individual items of luggage. Even more recently, the printed hang tag identification method has been supplemented by security requirements compelling passengers to present photo identification at the time of luggage check in.

Traditional luggage identification systems have suffered from the drawbacks inherent in their simplicity. Printed hang tags require manual inspection by security personnel, an extremely time-consuming process. Even optical bar code identification systems require that airport or security personnel handle the tag of each piece of luggage in order to pass the bar-coded tag in the appropriate orientation past an optical reader. As a result, it is impracticable to optically "scan" an individual item of luggage more than once during a passenger's journey. Also, printed hang tags, even when supplemented with passenger identification programs, are vulnerable to fraud and mistake.

It has been proposed to use small radio transmitters in an effort to increase the reliability and efficiency of luggage identification and tracking. It is known in the art to attach a radio transmitter to luggage to send an identifying signal to one or more receivers. It is contemplated that radio receivers will increase the rapidity and reliability of identifying each item in a large-volume stream of luggage by eliminating the need to manually handle each piece of luggage, and reduce the role of human visual inspections fraught with error. Radio transmitters, in conjunction with digital data processors, provide a means for improving luggage tracking and identification.

However, transmitter devices for use on luggage heretofore have generally suffered from one or more serious drawbacks, most notably bulkiness and high cost. Bulkiness has been the result of the size of the electronic components of the receiver and, frequently, the need for the transmitter to be accompanied by a self-contained power source such as a battery. Additionally, bulky identification devices are not conducive to dual use, for instance, the physical combination of the transmitter with traditional visual or more recent electronic optical identification labels. It heretofore also has been difficult to produce an electronic identification tag with a small yet functional antenna capable of being contained within a paper hang tag.

Ideally, an electronic identification tag has a sufficient transmission range to permit its signal to be received and processed from a distance. Many known devices utilizing radio transmission have comparatively abbreviated effective transmission ranges, thus requiring manual passage of the receiver "reader" near, for instance, less than 0.30 meter to the tag.

High cost has also hindered the development of viable electronic identification tags. An electronic hang tag ideally must be so inexpensive as to be a single-use device. An expensive transmitter must be reused on the luggage of multiple passengers on successive trips in order economically to recover the transmitter cost. Transmitter reuse thus becomes extremely undesirable due to the need to recover each device at the conclusion of a passenger's trip, re-distribute the device to a new point of origin for attachment to a second piece of luggage, etc.

Finally, known radio transmitter identification tag devices constitute another distinct item for attachment to a piece of luggage, separate from currently used bar-code tags. Separately attaching, and subsequently separately reading, the transmitter tag, apart from the bar-code tag engenders undesirably inefficient duplication of effort, leading to a considerable loss of time and therefor increased cost.

Accordingly, a need remains for an electronic identification tag that is inexpensive, reliable even at increased receiver ranges, and is very thin or small in order to be integrated within existing visual and/or optical tag devices.

SUMMARY OF THE INVENTION

It is therefore an object of the present invention to provide for a novel and improved baggage identification tag and method of tracking baggage at transportation facilities which is highly efficient and reliable to use.

It is another object of the present invention to provide for a novel and improved electronic identification tag for luggage which is capable of generating a signal containing a code unique to each article of luggage and passenger associated with that luggage which can be scanned over a broad range, is inexpensive and can be integrated into existing tag devices.

It is a further object of the present invention to provide for a novel and improved system and method for tracking luggage which is extremely versatile and conformable for use in combination with existing luggage identification systems and in which a way as to enable continuous monitoring of the movement and transfer of luggage as well as passengers at various transportation facilities.

It is an additional object of the present invention to provide for a novel and improved identification tag characterized by a long range antenna and transponder for generating a continuous RF signal containing a unique pre-programmed code which can be utilized alone or in association with other indicia on the tag to identify a passenger's luggage as well as other pertinent information between different given departure and arrival points.

In accordance with the present invention, there has been devised a baggage identification tag comprising at least one cover strip in the form of a paper-like substrate, a carrier strip having an antenna coil thereon and a transponder at one end of the coil, and means affixing the cover strip to the carrier strip with the antenna coil interposed therebetween. The antenna and transponder are capable of generating a signal having a unique code which can be correlated with printed information or other visual indicia to identify a passenger and the passenger's luggage as well as other salient information pertaining to the passenger's itinerary.

In the preferred form, the antenna is composed of copper lamina applied to opposite sides of the substrate and etched to form a pair of ultra-fine, spirally wound rectangular strands or halves which are connected to one another and to a common transponder chip and sandwiched between a pair of paper-like substrates to form a unitary tag. A series of tags may be constructed in continuous roll form, each tag consisting of separable tag portions, one tag portion being affixed to an article of luggage and another portion issued to the passenger.

In the method of the present invention, luggage is tracked at a transportation facility by affixing a first tag portion to each article of a passenger's luggage, a second tag portion containing printed information or other indicia correlated with the unique code of the transponder on the first tag portion is issued to each passenger, and monitoring the movement of the luggage between travel points. Movement of each passenger may be similarly monitored by issuance of a boarding pass capable of generating a signal corresponding to that of the first tag portion.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 3 is a plan view of the transmitter assembly of the present invention, showing in exaggerated detail the spiral configuration of the coil antenna;

FIG. 4 is an exploded side view of a preferred embodiment of the present invention;

DETAILED DESCRIPTION OF A PREFERRED EMBODIMENT

The apparatus of the invention broadly comprises an extremely thin electronic identification tag that reliably transmits a radio frequency (RF) signal even at comparatively extended transmission ranges. The tag signal broadcast by the invention is receivable by an RF receiver for processing by digital data processors, thereby permitting automated evaluation of various aspects of the tag, e.g., its movement through a transportation system. The intended use of the inventive identification tag is in conjunction with common carriers such as airplanes, and their associated terminals and baggage transportation systems. In this disclosure, "airplane" or "aircraft" is used to denote any mode of mass carriage of cargo, most especially people, and is intended to include, without limitation, passenger planes, buses, and trains. The inventive identification tag is affixed to luggage, and/or carried by passengers, to assure that luggage and passengers are properly routed, or recovered and redirected when lost. It will be immediately apparent however, that the identification tag finds useful application outside the mass transportation industry, and may find beneficial use wherever reliable identification and tracking of movable objects or persons is desired.

Prior art RF identification tags commonly have required weighty, voluminous batteries, or have suffered from inadequate transmission range to be efficacious. The present invention does not incorporate batteries, and yet manifests adequate transmission range to have utility in automated baggage transportation systems.

Figure 1:
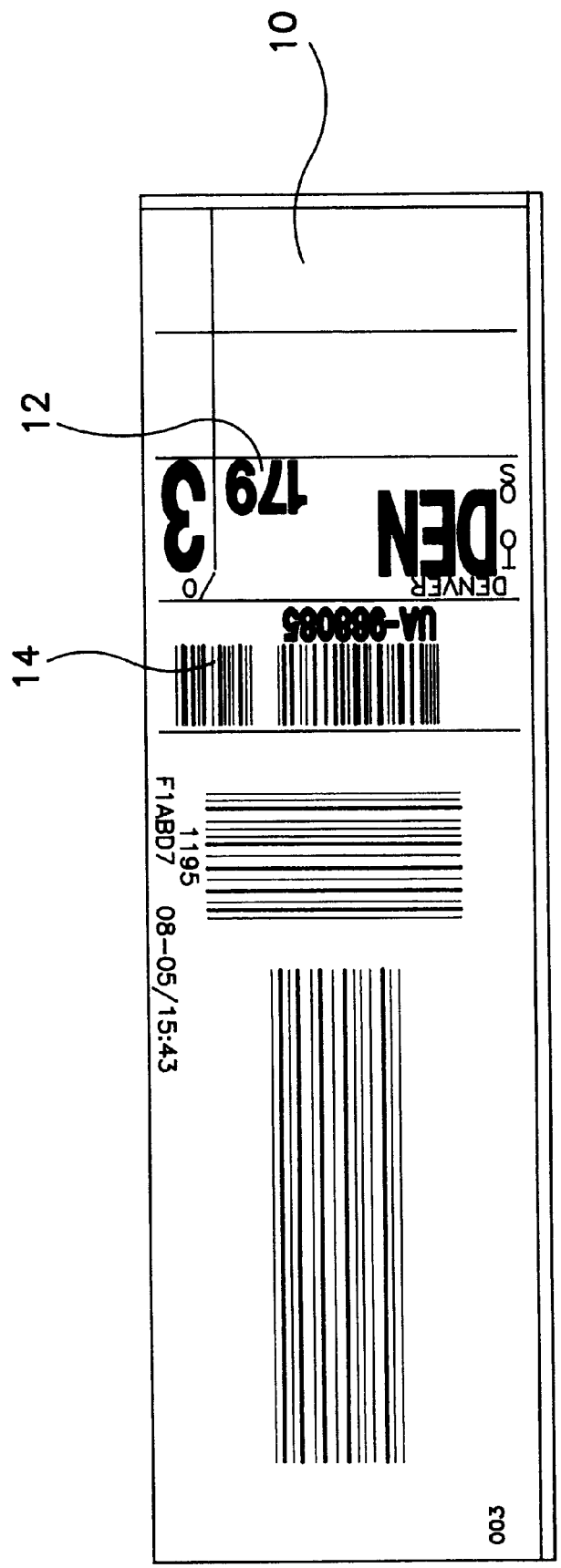
FIG. 1 is a plan view of a prior art identification tag usable in conjunction with an optical bar-code scanner.

FIG. 1 is a depiction of the prior art device 10 for baggage identification and tracking presently in common use. This device comprises a paper strip 5.0 to 6.0 cm wide and a fraction of a millimeter thick. The identifying indicia are printed on the strip using standard printing methods. Printed information comprises both ordinary printed information 12 readable with the naked eye, such as a flight number and destination, as well as bar codes 14 which are readable with known optical scanners. The strip 10 commonly has a self-adhesive portion to allow the strip 10 to be wrapped around the handle of an item of luggage and adhered to itself for the duration of the scheduled journey.

Figure 2:
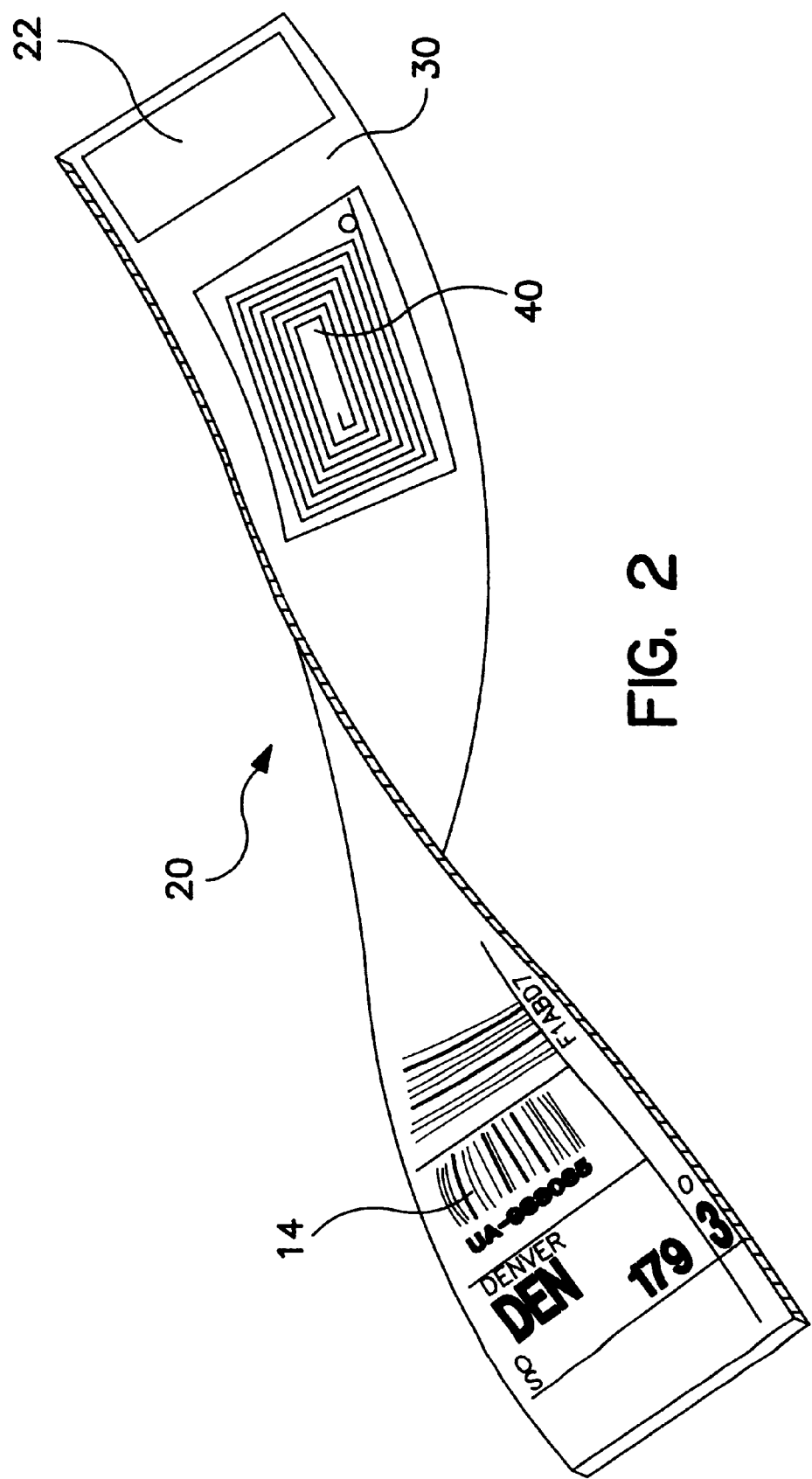
FIG. 2 is a perspective view of a preferred embodiment of the present invention, showing the transmitter assembly mounted upon the bottom of a paper tag strip.

Attention is directed to FIG. 2 showing the identification tag 20 of the invention. In one preferred embodiment, the invention includes at least one paper layer 30 to which is affixed, as with a permanent adhesive, an RF transmitter assembly 40 according to the invention. Notably, the transmitter assembly 40, to be further described, is sufficiently thin and flexible to be affixed to or within a conventional paper tag similar to the tags 10 known in the art. An advantage of the invention is the adaptation of a single tag 20 to bear a dual identification system, i.e. the bar codes 14 after the manner of the prior art as well as the RF transmitter assembly 40 according to the present invention. The identification tag 20 of the present invention also includes, if desired, a self-adhesive strip 22 as known in the art, whereby the entire tag 20 may be looped through the handle of an item of luggage, and attached to itself for secure use during flight transfers, etc.

Attention is invited to FIGS. 3 and 4, showing the main components of the RF transmitter assembly 40 of the invention. A principal advantage of the invention is the provision of an ultra-thin antenna 44 that nevertheless has sufficient looped length whereby a working current may be induced therein to power the transmitter, even when the assembly 40 is up to 1.60 m from the induction antenna. The preferred embodiment of the transmitter assembly 40 includes an insulative carrier board 42, an antenna 44 comprising, in the preferred embodiment, two spirally looped portions 45, 45' disposed on either side of the carrier board 42, and an integrated circuit transponder chip 48. The transponder chip 48 is connected in series circuit with the antenna 44, so that current induced in antenna 44 powers the chip 48.

The carrier board 42 comprises an extremely thin sheet of glass fiber epoxy material. Due in part to its thinness, the carrier board 42 is resilient and flexible and of sufficient strength to be essentially unbreakable. The carrier board 42 acts as an insulator as well as to provide the structural backboard to the conductive electronic elements of the assembly 40.

The preferred embodiment of the transmitter assembly 40 features an antenna coil 44 comprising two spirally "wound" halves, although in some applications a single spiral loop may suffice. FIG. 3 shows one half 45 of the antenna 44 of the invention. The other half 45' of the antenna is substantially the same, and is provided on the opposite side of the carrier board 42. For clarity, FIG. 3 exaggerates and tremendously enlarges the physical pattern defined by the antenna 44. As illustrated, a half 45 of the coil antenna 44 shows approximately twelve rectangular, spiral revolutions. Within the innermost revolution, the conductive element of the antenna coil 44 pierces and passes through the insulative carrier 42 at point 49, so that each half 45, 45' starts generally in the center of the carrier board 42 and winds in a rectangular spiral outwardly toward the edge of the carrier board 42. The two ends 50, 51 of the single coil are conductively connected to the terminals of the transponder 48, which is permanently adhered to one side of the carrier board 42. As shown in FIG. 4, one end 50 of one half 45 of the antenna coil is on the same side of the carrier board 42 for connection directly to the transponder chip 48, while the other end 51 pierces the carrier board at a point 52 near the transponder chip 48 to be connected thereto.

In the preferred embodiment of the invention, each half 45, 45' of the coil antenna 44 comprises far in excess of the 12 revolutions shown in FIG. 3 for the sake of illustration. The preferred embodiment of the transmitter assembly 40 has an antenna coil 44 having approximately 400 revolutions, with each half 45, 45' of the antenna coil 44 having about 200 revolutions. Each revolution is separated from either of its adjacent revolutions by an insulating distance of approximately 50 pm, so that the antenna conductor element and its adjacent insulative space occupy about 0.10 mm of lateral space upon the carrier board 42. Each revolution in the spiral thus consumes about 0.20 mm of lateral length and about 0.20 mm of lateral length upon the carrier board 42. Individual revolutions of the antenna coil 44 thus are not visible to the naked eye, but can be viewed only with optical magnification. Each half 45, 45' of the antenna coil 44 comprises approximately 30 linear meters of conductor. Advantageously, the approximately 200 revolutions are spirally "wound" within a rectangle of only approximately 50 mm by approximately 80 mm, and thus comfortably fit upon a flexible carrier board 42 of only approximately 54 mm by approximately 86 mm, sufficiently small to be incorporated within the size of a tag strip 10 currently in use. Yet, because of the numerous total revolutions (about 400) and total length (about 60 meters) of conductor comprising the complete coil antenna 44, the transmitter assembly 40 can be actuated by induction "reader"/receiver devices, and effectively transmit a signal over useful distances.

The need for an ultra-fine strand of conductor element in the antenna 44 precludes the use of ordinary copper wire in the manufacture of the transmitter assembly 40. Rather, each of the halves 45, 45' of the preferred embodiment is manufactured first by adhering a thin (less than 0.05 mm) copper lamination upon either side of the carrier board 42. A glass stencil of the desired spiral-wound pattern for each half 45, 45' is produced using known techniques. The copper lamination on each side of the carrier 42 is then electronically etched according to known laminated type FR 40 processes. Simply described, using the stencil, each spirally wound antenna half 45, 45' on either side of the carrier board 42 is created by the passage of a computer controlled, robotically manipulated laser beam, which beam "etches" the previously deposited copper lamination to burn the spiral pattern into the copper lamination to create the insulative space between adjacent revolutions. The "unburned" copper remains intact upon the carrier board 42 to define the ultra-fine conductive strand comprising the complete antenna coil 44.

With the described antenna 44, the inventive identification tag 20 overcomes the shortcomings in the prior art by being small and thin, obviating the need for a battery to power the transponder chip 48, and yet having an adequate transmitting/receiving distance. We have determined that a rectangular, rather than circular, spirally wound antenna coil of at least 400 revolutions is desirable to meet transmission performance specifications, and yet the antenna of our inventive tag 20 nevertheless fits within conventionally sized prior art identification tags 10. The antenna coil 44, having a total length of about 60 meters spirally wound through about 400 total revolutions, is sufficiently sensitive to induce a current to power the transponder 48 even when the inductive field is generated by standard reader/scanner antenna up to a meter away. The adequately powered transponder 48 in turn is able to transmit an RF signal reliably detectable from the same distance. Working identification tags 20 according to the preferred embodiment effectively operate at 173 kHz, with approximately 9.0 mH of inductance and capacitance equalling approximately 100.00 pF.

After the spiral "loops" have been etched into the copper sheet to define each half 45, 45' of the antenna coil 44, the transponder chip 48 is permanently affixed, using standard chip-on-board mounting techniques, to the carrier board 42, as shown in FIGS. 3 and 4, and provided with electrical contact with the outer ends 50, 51 of the antenna coil 44.

The transponder chip 48 is a known read-only device, such as chip Model Number H4001 available from EM Microelectronic-Marin, SA, of Marin, Switzerland. The transponder chip 48 is a CMOS integrated circuit powered by current induced in an external coil, in the present invention the antenna coil 44, when the coil is placed in a magnetic field. The induced current is AC, but is rectified by a Graetz bridge within the transponder chip 48.

The transponder chip 48 has at least a 32 bit, and preferably a 64 bit, hexadecimal form memory array, which is laser programmable. The preferred chip 48 has a wide dynamic range due to an on-chip buffer capacitance and a voltage limiter, and also features a full wave rectifier. The chip 48 gets its clock from the same field as that which powers the chip, via one of the coil terminals on the chip. The other terminal is affected by a modulator, turning on and off the modulation current in order to transmit the 32 or 64 bits of unique information contained in the factory preprogrammed memory array. The laser programming of the chip 48 is performed at the factory by laser fusing of polysilicon links in order to store a unique code on each chip. In the preferred embodiment, the serial output data string contains a 9 bits header, 40 bits of data, 14 parity bits, and one stop bit. The data bits may convey such data as a unique passenger code number, which is then directly associated with a passenger's identity and itinerary. The preferred chip 48 has a 50,000 baud reading at 3 MHz frequency, and alternative acceptable and available 32-bit chips may transmit data according to the RS 232 standard, at a 9600 baudrate at 125 kHz (the preferred frequency of major international airlines).

Once the transponder chip 48 has been secured to a side of the carrier board 42, the entire transmitter assembly 40 preferably is enveloped between two layers of paper 30, 32 which serve not only to protect the transmitter assembly 40, but also to carry conventional printed data such as bar codes 14 and also adhesive 22 as explained. The transmitter assembly 40 may be contained within a paper tag 20 bearing the printed information manifested on known identification tags 10. Airline personnel need only handle and attach a single inventive identification tag 20 to each item of luggage, thus reducing time and costs. Perhaps more importantly, the inventive tag 20 permits the RF transmitter identification tag technology to be "phased in" without dramatically altering existing identification devices and systems. Currently used optical scanner infrastructure and methods may continue to be used by airport personnel, alongside and concurrently with the present invention. Indeed, the inventive tag 20 will be visually distinguishable from the currently used tags 10 only upon close inspection or dismantling.

Figure 5:
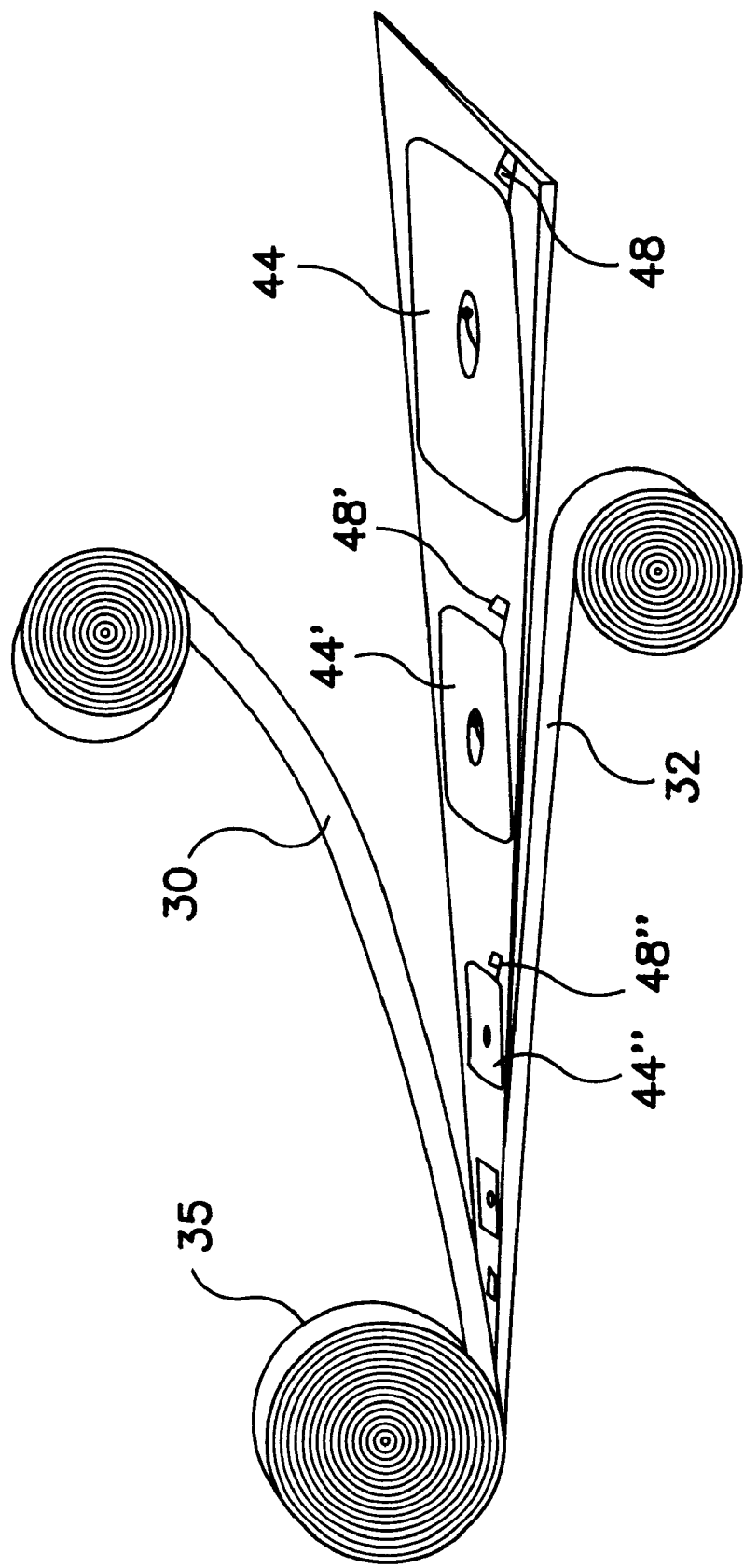
FIG. 5 is a perspective side view of a preferred mode of manufacture of a plurality of preferred identification tags of the present invention.

FIG. 5 illustrates that the preferred mode of manufacture of the invention is in series, so that numerous identification tags 20 are produced in bulk. An extended strip of very flexible glass fiber epoxy carrier board 42 bears along its length a serial plurality of laser-etched copper coil antennae 44, 44', 44', to each which antenna 44 a corresponding transponder chip 48, 48', 48' (pre-programmed at the factory with its unique data string) has been conductively connected. The carrier board 42 is then "rolled" between two rolls of paper strip 30, 32, which are adhered together with known adhesives. The resulting three-ply identification tag strip may then be rolled up in a single roll 35 for transportation and use. At the airport terminal, the roll 35 may be fed through printers (not shown) in order to print thereon a bar code 14 and other data corresponding to each transmitter assembly 40.

An advantage of the invention is that it is economically produced. Because the device can be mass-produced using few and comparatively inexpensive parts, it is possible to manufacture an inventive identification tag 20 at a price that permits the tag to be truly disposable. At the end of his or her journey, the passenger may simply remove and discard the identification tag 20, as presently is done with prior art tags 10.

Another tremendous advantage of the invention is the ability to run the inventive identification tag 20 through standard braced printers without damaging the printer head or substantially affecting printing quality. The completed inventive tag 20 is only approximately 0.20 mm thick, while most conventional desk-top printers specify that the printer head cannot be separated from the surface of the paper by more than about 0.30 to 0.40 mm. Thus, the inventive identification tag 20 can be run through a printer and imprinted with all the visual and bar-code data presently used on prior art tags 10, while yet incorporating the RF transmitter technology.

Figure 6:
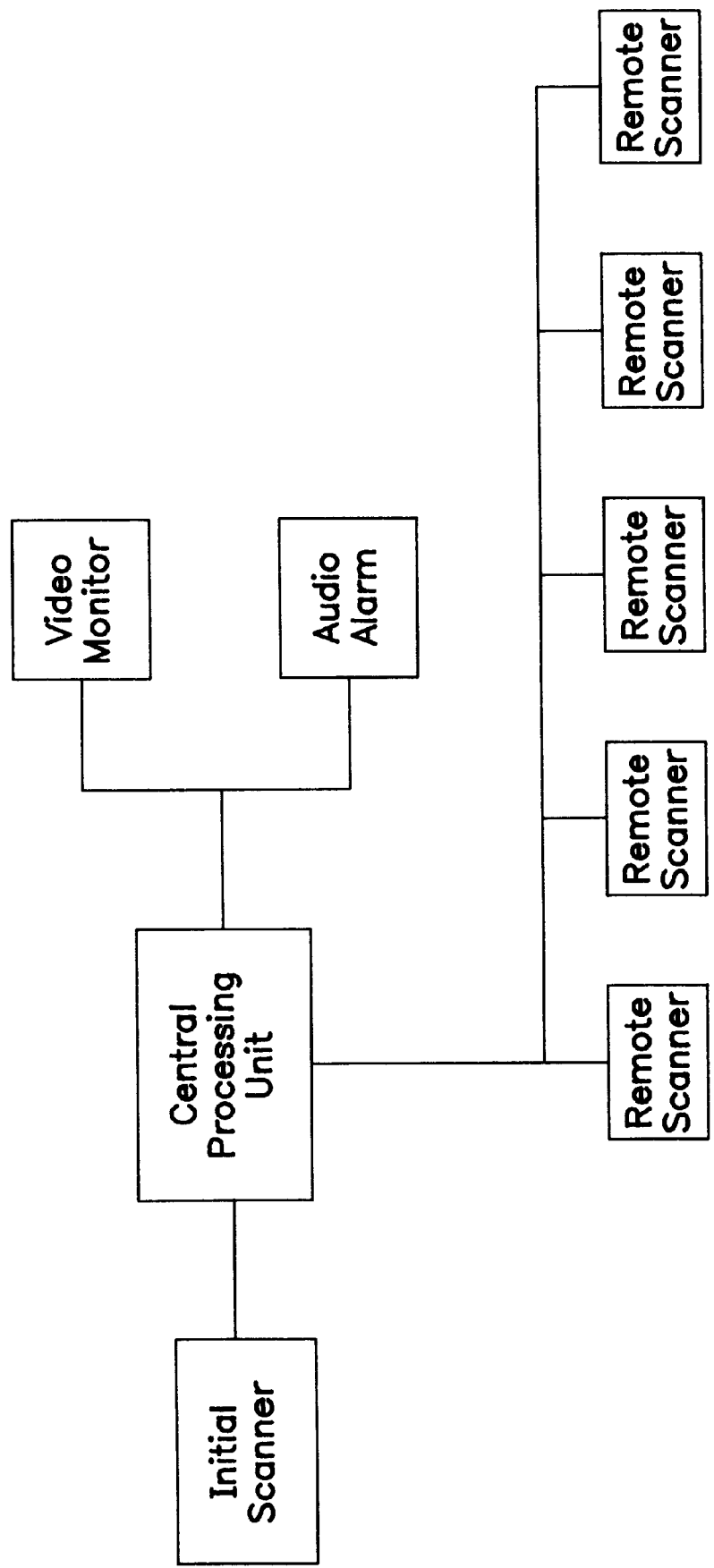
FIG. 6 is a schematic diagram of the digital processing system useable in conjunction with the inventive identification card of the present invention.

FIG. 6 schematically shows a system for processing the data carried by a particular inventive tag 20. The digital data processing is performed in a high-speed central processing computer unit (CPU). The CPU is in signal communication with the initial scanner, and one or more remote scanners. The data retrieved by the initial and remote scanners is processed by the CPU, and displayed, as desired, by a video monitor. Also, an audio alarm may be provided so that when particular pre-programmed conditions occur, e.g., a particular item of luggage takes an unacceptably long period of time to move from one remote scanner to another, the audio alarm will alert terminal personnel.

The scanners include two functional components, a magnetic field generator, and an RF receiver. An RF reader/scanner device that may satisfactorily be used with the inventive identification tag 20 is Model No. PRX-20 manufactured and available from Deister Electronics, of Hanover, Germany. Each scanner, the initial as well as the remote ones, generates an magnetic field. When the identification tag 20 enters the field, a current is induced in the antenna 44, which current powers the transponder chip 48. The transponder chip 48 immediately transmits its small data string, which is received by the scanner. The scanner then transmits the data to the CPU for processing and storage.

Each of the scanner stations, including the initial scanner station, preferably is equipped to receive both the RF transmission from the transmitter assembly 40, and to read the optical bar code printed on the paper layer 30 to which the transmitter assembly 40 is affixed. In the case of the initial scanner, the "reading" of the RF transmitter can actually take place during the act of printing the visual matter on the tag 20, since the RF receiver/scanner may be integrated with the printer. Thus, when a passenger presents herself for check-in, an identification tag 20 according to the invention is situated on the input side of a standard airport ID tag printer. The airport personnel obtain identification confirmation from the passenger, which information is input into the CPU and correlated with the passenger's itinerary information. The CPU can then instruct the printer to generate a printed identification tag 20 bearing the appropriate conventional bar codes 14, etc. Simultaneously, at the time of printing, the initial scanner induces a current in the transmitter assembly 40 within the particular identification tag 20 and the transponder chip 48 transmits its unique number code to the initial reader for input into the CPU and correlation with the passenger's identification and itinerary. The identification tag 20 is removed from the printer, and placed upon the passenger's item of luggage using the adhesive strip 22 or the like. If desired, a paper "boarding pass" may similarly be generated, its unique transponder passenger code number input into the CPU, and the "pass" delivered to the passenger.

The passenger and her luggage then proceed toward loading gates, etc. according to convention. However, at designated locations along the luggage and passenger "streams", one or more remote scanners as shown in FIG. 6 are poised to receive signals from the identification tag 20. Typical locations for remote scanners might be along luggage conveyor belts, at passenger security check points, and the like. Each time the passenger's "boarding pass", or her identification tag 20 on her luggage, passes within approximately one meter of a remote scanner, the transponder chip 48 therein is activated by the current induced in the antenna 44 by the magnetic field generated by the remote scanner. The chip 48 transmits its unique identifying signal to the remote scanner, and the signal is then transmitted on to the CPU for further processing.

The CPU may be programmed to perform a variety of evaluations and comparisons on the data received from the remote scanners. The operator of the system can, for example, define individual logical units in the passenger or luggage stream, and relate unique physical unit identities to the logical units. The operator is able to specify which remote scanner stations are to serve as control stations for particular time conditions in the system, if desired, to adjust the system for interruptions or operating anomalies. Most importantly, perhaps, the CPU may be programmed to perform predefined actions based on events that have occurred in the system. For example, if a particular identification tag 20 passes by a remote scanner associated with an airline for which the corresponding luggage owner does not have a ticket, the CPU can send a visual cue to the video monitor, or send an audio alarm, to warn of fact that the luggage has been misdirected and must be retrieved. Similarly, as an inventive identification tag 20 passes by a first remote scanner, it sends its signal to the CPU which recognizes and logs the arrival of the corresponding piece of luggage at that location in the luggage stream. If that same identification tag takes more than a pre-designated amount of time to reach the next remote scanning station, the CPU recognizes the delay and identifies the tardy or missing luggage by passenger name, airline, flight number, etc., in order that remedial action can be taken.

Accordingly, the invention forms an integral component of a complete system for identifying and tracking luggage. The innovative tag, carrying a unique number, is assigned to a passenger's article of luggage at the time of check-in, permitting the luggage to be tracked from check-in through to loading. Optionally, a second inventive tag, in the form of a "boarding pass", is assigned directly to the passenger herself, permitting the passenger's progress to the aircraft also to be tracked electronically.

The current check-in routine at airports around the world is essentially unaffected by the use of the inventive tag. The passenger, probably having previously made a reservation, presents herself and her baggage at the terminal to obtain a ticket, boarding pass, and/or gate assignment. At that time, the passenger's verified identity, address, itinerary, and the like are entered into system computers, or confirmed if already resident in the database.

The inventive tag is electronically "scanned" with the receiver reader at the time of check-in, whereby the unique signal of the tag is associated in the computer database with the other identification and itinerary data pertaining to the passenger. The identification tag "boarding pass" likewise may be scanned, if desired. Advantageously, the electronic scanning may be performed concurrently with the scanning processes of systems in current use, for example the optical scanning of bar-code systems. In this manner, use of the inventive tag may be phased in without dramatically altering existing transportation infrastructures and routines. Known optical systems and the like may then be gradually phased out, or remain in place as parallel or back-up identification systems.

A series of receiver readers may be installed at various locations in the passenger terminal, for example along conveyor belts, to enable the automated tracking of the progress of the luggage in the luggage "stream". Similarly, the "boarding pass", if used, may be read when the passenger passes through security, and/or at the time of passenger boarding, to confirm that the passenger in fact boards the aircraft. Because the inventive tag can be "read" from a range of up to one meter, there is no need to manually scan each piece of luggage, or each passenger, as it passes a receiver reader. At each receiver reader station, one receiver may be provided with three separate antennas, allowing the tag signal to be received without regard for the tag's orientation in space. The tag thus offers a considerable advantage over optical scanners, which generally require that the tag be positioned in a particular position or alignment with respect to the reader.

The advantages of the invention in reducing the volume of lost luggage is evident. When an article of luggage is inadvertently routed toward the wrong airplane, the inventive tag will be scanned by a receiver reader in the wrong airplane's luggage stream, and the mismatch between the tag and the passenger's itinerary is recognized by the computer. Airline personnel are immediately alerted, and baggage handlers notified to re-direct the luggage to the correct flight, or at least to "pull" the luggage from the wrong flight.

Luggage loss prevention is further enhanced if the "boarding pass" identification tag also employed to track the passenger's location. The cooperative use of a luggage tag and a boarding pass permits the data processor to alert airline personnel in the event an item of luggage is separated its owner. A reader receiver at or near the aircraft will register the loading of a passenger's suitcase. In the event the passenger does not also present his boarding pass to be scanned at the scheduled moment of boarding, the data processing system recognizes the presence of the "orphan" luggage already aboard the plane. Any luggage owned by a passenger not aboard the airplane may then be retrieved and immediately returned to the tardy passenger, or otherwise held for processing.

The invention also provides a powerful deterrent to terrorist activity at passenger terminals by making it possible closely to monitor passenger and/or luggage movement through the terminal. For example, if a particular passenger or his luggage takes an unusually long time to pass between two designated receiver reader stations in an airport, the data processing system alerts terminal personnel of the discrepancy, making it considerably harder for a terrorist to tamper with his luggage undetected. The use of the inventive tag on luggage and in boarding passes similarly will warn authorities if a passenger who has checked luggage does not board the flight.

We claim:

1. In a baggage identification system for tracking the movement of each of a plurality of baggage items in a transportation terminal, a baggage identification tag adapted to be placed on each baggage item comprising:
   at least one cover strip in the form of a paper-like substrate;
   a carrier strip having an antenna coil thereon and transponder means at one end of said coil for generating a signal having a unique code to permit tracking said tag on each said baggage item; and
   means for affixing said cover strip to said carrier strip with said antenna coil interposed therebetween.

2. In a baggage identification tag according to claim 1, said coil being composed of an ultra-fine electrically conductive material.

3. In a baggage identification tag according to claim 1 wherein said coil is spirally wound upon said carrier strip.

4. In a baggage identification tag according to claim 1 wherein said antenna coil is composed of a lamination of copper etched into an ultra-fine, spirally wound rectangular strand.

5. In a baggage identification tag according to claim 4, wherein said antenna coil has a length of 60 meters wound into 400 revolutions.

6. In a baggage identification tag according to claim 1, wherein said antenna coil is comprised of two coil halves on opposite surfaces of said carrier strip, first ends of said halves connected together and second ends of said halves being connected to said transponder.

7. In a baggage identification tag according to claim 6, wherein said antenna coil is defined by copper laminations on said opposite surfaces etched into said coil halves.

8. In a baggage identification tag according to claim 6, there being a pair of said cover strips affixed to opposite surfaces of said carrier strip.

9. In a baggage identification tag according to claim 1, wherein said affixing means is an adhesive.

10. In a baggage identification tag according to claim 1, wherein said transponder is a CMOS integrated circuit chip powered by current induced in said antenna coil and rectified by a Graetz bridge in said chip.

11. A baggage identification tag according to claim 1 wherein:
said unique code contains a 9 bit header, 40 bits of data, 14 parity bits, and one stop bit.

12. A luggage identification system comprising in combination:
a first tag including an antenna and transponder means thereon for generating a signal having a unique code; and
a second tag containing indicia correlated with said unique code associated with said first tag portion; and
means for affixing said second tag to said first tag with said antenna and transponder means interposed therebetween.

13. A luggage identification system according to claim 12, said first tag bearing indicia corresponding to said indicia on said second tag.

14. A luggage identification system according to claim 12, wherein said indicia is in printed form and said code is correlated with the identity and itinerary of each said passenger.

15. A luggage identification system according to claim 12, further including:
at least two scanner stations, each said scanner station having a magnetic field generator for inducing a current in said antenna to power said transponder means and an RF receiver for receiving said unique code from said first tag portion; and
a digital data processor in signal communication with each said scanner station for correlating said unique code of said first tag portion and said indicia of said second tag portion.

16. A luggage identification system comprising in combination:
a first tag portion including an antenna and transponder means thereon for generating a signal having a unique code;
a second tag portion containing indicia correlated with said code associated with said first tag portion; and
a plurality of said first and second tag portions being provided in serial form and being separable into individual tags, each said tag comprising a pair of said first and second tag portions.

17. A luggage identification system according to claim 16, wherein said signal is an R signal, and scanning means are provided including a magnetic field generator and an R receiver for sensing said signal.

18. A luggage identification system according to claim 16, wherein a boarding pass is provided for each said passenger containing an antenna and transponder means for generating a signal corresponding to said signal generated by said first tag portion.

19. The method of tracking luggage at a transportation facility comprising:
affixing a first tag portion to each article of luggage of a passenger wherein said first tag portion contains an antenna and transponder for generating a continuous RF signal having a unique code;
providing a second tag portion containing indicia correlated with said code of said first tag portion; and means for affixing said second tag to said first tag with said antenna and transponder interposed therebetween;
monitoring each said article of luggage between departure and arrival points by sensing said signal generated at periodic intervals therebetween.

20. The method according to claim 19 including the step of providing said first and second tag portions in serial connected form and separating said first and second tag portions from one another when said first tag portion is affixed to said article of luggage.

21. The method according to claim 19 including the step of providing a boarding pass capable of generating a signal corresponding to said signal generated by said first tag portion.

* * * * *